United States Patent [19]
Konishi et al.

[11] Patent Number: 4,859,427
[45] Date of Patent: Aug. 22, 1989

[54] ACTIVE METAL BED

[75] Inventors: Satoshi Konishi; Takanori Nagasaki; Nobuhisa Yokogawa, all of Tokai; Yuji Naruse, Mito, all of Japan

[73] Assignee: Japan Atomic Energy Research Institute, Tokyo, Japan

[21] Appl. No.: 160,906

[22] Filed: Feb. 26, 1988

[30] Foreign Application Priority Data

Feb. 27, 1987 [JP] Japan ................................ 62-042718

[51] Int. Cl.$^4$ ............................................. B01D 50/00
[52] U.S. Cl. ........................................ 422/159; 55/68; 55/208; 55/387; 423/648.1; 423/171; 423/239
[58] Field of Search ........................... 55/68, 208, 387; 423/648 R, 648 A, 648.1; 422/212, 239, 159, 171

[56] References Cited

U.S. PATENT DOCUMENTS 4,447,727 4/1984 Yanagihara et al. .................... 55/68
4,544,527 10/1985 Megerhoff ............................ 55/387
4,687,650 8/1987 Goodell .............................. 55/68

Primary Examiner—Bernard Nozick
Attorney, Agent, or Firm—Oblon, Spivak, McClelland, Maier & Neustadt

[57] ABSTRACT

An active metal bed provided with a filter unit of sintered metal having a wide surface in the horizontal direction, enclosing an active metal powder running a reversible hydrogenation reaction therein and, which is single or plural combined in series, a heater attached thereto and an airtight container housing them, and characterized by, at the time of absorbing hydrogen isotope gas, contacting or flowing the gas to the active metal through the filter, while preventing the scattering of active metal powder, to obtain a large hydrogen absorption velocity by a wide gas contacting area and a decreased pressure loss at the time of gas flowing, and characterized by, at the time of releasing hydrogen isotope gas, preventing the overheating of air tight container and the permeating of hydrogen thereby while heating only the filter unit by the heater.

3 Claims, 5 Drawing Sheets (a)

(b)

ACTIVE METAL BED

BACKGROUND OF THE INVENTION (a) Field of the Invention

The present invention relates to an active metal bed. More particularly, the present invention relates to an apparatus aiming at recovery, storage and supply of hydrogen isotopes containing tritium gas, and to an active metal bed characterized by a constitution of a filter unit that makes it possible to flow a gas through an active metal without bringing about a large flowing resistance and a bypass flow while obtaining a high absorption velocity of tritium by a wide contacting area of gas, and characterized in that the tritium absorption velocity and thermal characteristic have been improved by enclosing a heat absorber aiming at an absorption and conduction of heat together with the active metal into the filter unit.

(b) Description of the Prior Art

Up to now, in order to recover a mixture of hydrogen isotope gases containing tritium (hereinafter referred to as "tritium" simply) from pure gas or a mixture with other gasses, a so called "active metal bed" in which plural stages of filter are placed in a sealed container and an active metal such as uranium is put on each filter stage has been used.

This will be explained as follows: In FIG. 1, 1 is an active metal; 2 is a filter; 3 is a sealed container; 4 is a heater; and 5 is an outer receptacle.

Tritium is absorbed and released by the reversible hydrogenation reaction of the active metal 1.

In the absorbing operation of pure hydrogen isotopes (tritium), tritium is introduced by an introducing tube 6 and absorbed to the active metal 1 on the filter shelf (a), (b), (c) in turn.

In case of intending to recover tritium from a gas mixture, tritium is absorbed into the active metal 1 while the gas mixture is flowing from the introducing tube 6 to a discharging tubing 7, and unabsorbed components are exhausted through the discharging tube 7.

This apparatus is used for the storage and supply of tritium as it is, where tritium is stored as a metal hydride and is released by heating the hydride.

In general, in an active metal bed, the active metal is enclosed in a filter for preventing its scattering since it is pulverized with the hydrogenation reaction. Moreover, the active metal cannot be filled up very high in the vertical direction within the filter because it is in danger of sintering by its weight. In order to secure the necessary capacity of tritium absorption, it is necessary that the active metal is filled up separately in plural stages, as described above, and a space is provided in the upper portion in each stages for absorbing the volume change of metal with the hydrogenation reaction.

Therefore, in the prior active metal bed, as shown in (a), (b) and (c) of FIG. 1, the active metal is placed on a shelf of plural stages of the filter 2. This structure is low in efficiency at the time of tritium absorption because the filter and metal powder having a large resistance to movement of gas and active metal powder are disposed in series along the gas flowing path from the introducing tube 6 to the discharging tube 7. That is, tritium entering from the introducing tube 6 is at first absorbed only on the under surface of shelf (a), and (b) and (c) do not act when (a) performs the absorption. Therefore, in case of urgent recovering of tritium, and other cases when recovery speed is essential, it is very inconvenient because only a portion of active metal contributes to absorption, and the recovering velocity is small. Moreover, after (a) is saturated with tritium, (b) commences absorption, but at this time gas has to pass through (a), which resists thereto. Further, after (a) and (b) are saturated, they block the movement of gas to (c).

Specially, in case of absorbing pure hydrogen isotope gas, this effect is so remarkable that, since the pressure in the interior of the bed decreases as the recovery goes forward and generally the conductance of filter and active metal powder decreases with the reduction of pressure, the movement of gas in low pressure is extremely obstructed and the absorption becomes slow. The disadvantageous point of this structure is the same also in case when gas flows through the bed. The pressure drop from the introducing tube 6 to the discharging tube 7 is so large that it is difficult to flow gas.

Moreover, the active metal bed as described above has such a disadvantageous point that the temperature of active metal rises due to the heat of hydrogenation reaction. Since all active metals used for the bed have a property such that the equilibrium pressure for hydrogen rises exponentially with the temperature, tritium absorption becomes insufficient for the equilibrium pressure increase when temperature rises. The generation of heat in the hydrogenation reaction is large and rapid, while the heat capacity of active metal powder is small and the heat conductivity is low since the powder is filled up coarsely. Therefore, in such an active metal bed, the generation of heat at the time of tritium absorption causes a rise in temperature of the active metal, and the absorption stops at the moment when the tritium partial pressure attains the equilibrium pressure at the elevated temperature, and thereafter the absorption of tritium proceeds at a low velocity as the active metal is cooled spontaneously.

On the other hand, in case of using the bed for supplying tritium, the sealed container 3 is heated, but the above described active metal bed has a structure such that the heat conductivity to active metal is not good. When heating the active metal, the heat from the heater 4 has to be conducted for a long distance from the outer wall of the sealed container 3 to the center radially through a sintered metal filter that is poor in heat conductivity. Moreover, neither the heat conductivity of the filter to active metal powder nor that between active metals is good. Consequently, it takes a long time before releasing of tritium, and it is feared that the active metal is superheated for poor temperature control so that the tritium pressure becomes excessive, or sintering of active metal and disconnection of heater occur due to local superheating.

The above defects are particularly remarkable in an active metal bed in which the tritium absorption capacity is large and in which, consequently, the amount of active metal to be filled up must be large. In a bed filled up with a large amount of active metal, the number of filling-up layer must be increased, for the height of filling-up cannot be increased. When arranging the layers in series, the resistance to absorption and flowing of gas is further increased. Moreover, since among materials constituting the bed, the rate of active metal increases and the rate of construction material and filter contributing to heat absorption and heat conductivity decreases relatively, the problem of heat generation and heat conductivity becomes more serious. In short, it is very difficult to make an apparatus that has large capacity with the structure of such active metal bed which has been hitherto used.

Such bed which has been hitherto used has a disadvantageous point in the aspect of tritium permeability. When tritium is released, the sealed container is heated to elevated temperatures, and at this time the amount of tritium permeating cannot be neglected because about 1 atmosphere of tritium exists. This tritium is collected into the outer receptable 5, and it has to be removed by gas purge, vacuum pumping, etc. The operation is complicated, and the loss of tritium is disadvantageous.

OBJECT OF THE INVENTION

An object of the present invention is to provide an active metal bed which is free from these faults and in which tritium can be recovered upto lower pressure in a short time, the pressure loss is reduced at the time of gas flowing, the temperature control in heating for releasing tritium is performed well, and tritium permeability is little. Another object of the invention is to make it possible to provide a specially large capacity of apparatus.

BRIEF DESCRIPTION OF THE DRAWING

FIG. 1 is a figure showing an active metal bed used in the prior art, in which

| 1 | Active metal powder; | 5 | Outer receptacle; |
|---|---|---|---|
| 2 | Filter; | 6 | Introducing tube; |
| 3 | Sealed container; | 7 | Discharging tube; |
| 4 | Heater; | | |

(a), (b) and (c) show the order of each stage which tritium is absorbed, respectively.

Figure 1:
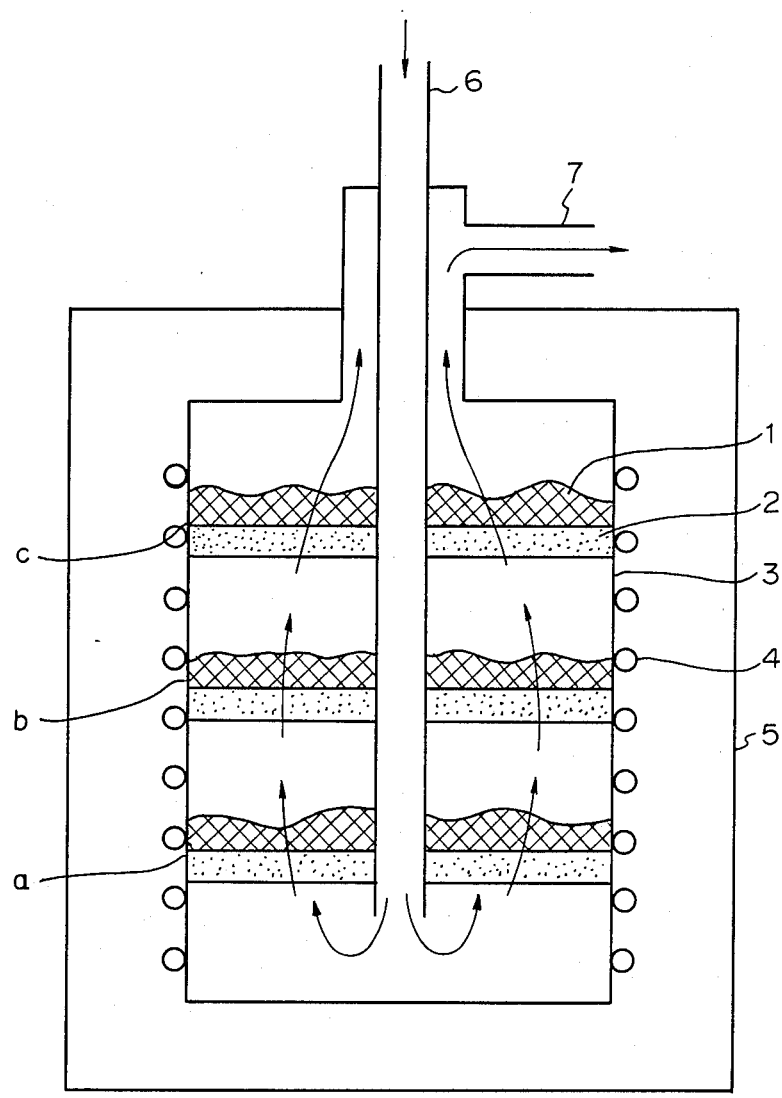
Figure 2:
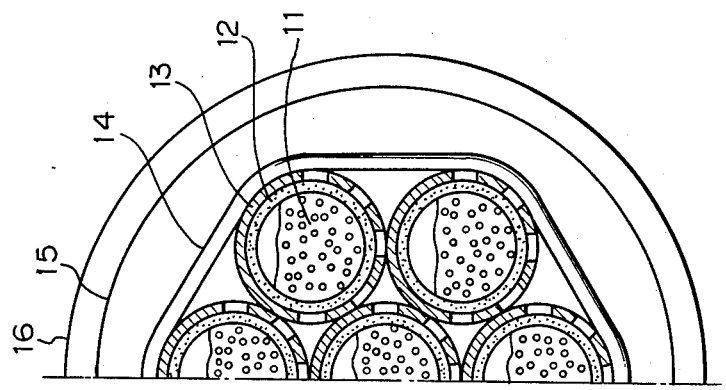
Figure 2:
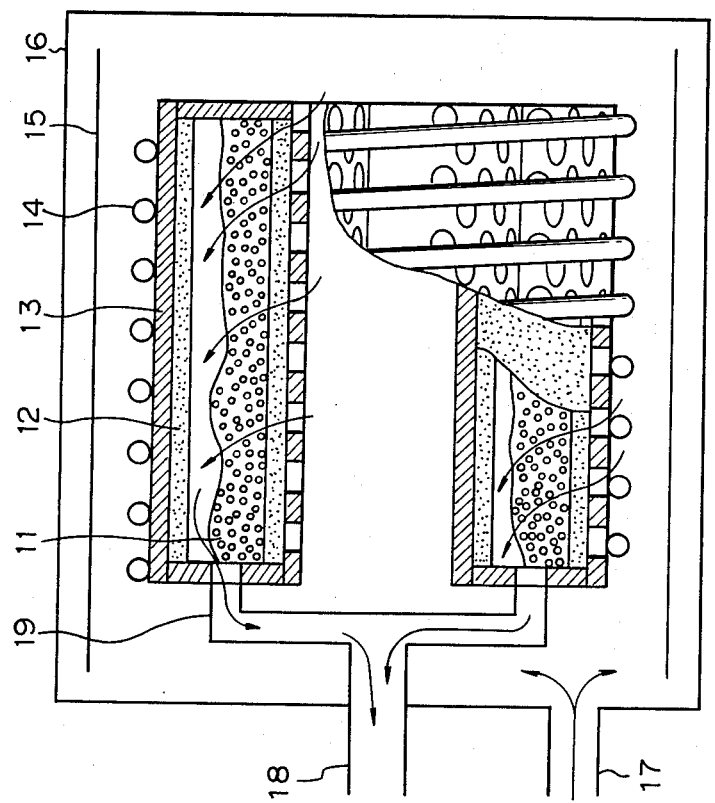

FIG. 2 is a figure showing a horizontal-cylindrical type of active metal bed as an embodiment of the present invention, in which

| 11 | Active metal | 16 | Outer receptacle; |
|---|---|---|---|
| | Heater absorber; | 17 | Introducing tube; |
| 12 | Filter; | 18 | Discharging tube; |
| 13 | Equithermal block; | 19 | Gas discharging |
| 14 | Heater; | | header; |
| 15 | Heat shield plate. | | |

Figure 3:
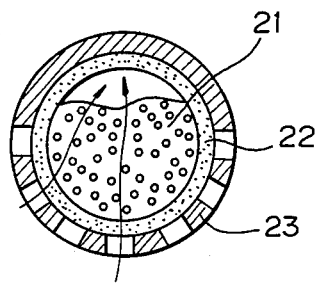
Figure 3:
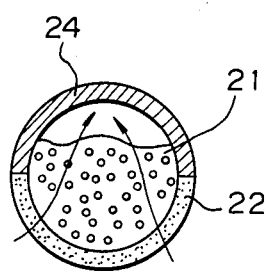

FIG. 3 is a figure showing a section of filter unit in the radial direction, in which 21 Active metal.Heat absorber;
22 Filter;
23 Equithermal block;
24 Metal tube:

and the equithermal block is a metal tube which is opened only in the lowe half part; in (b), only the lower half part is a filter and welded to the upper half part of metal tube.

Figure 4:
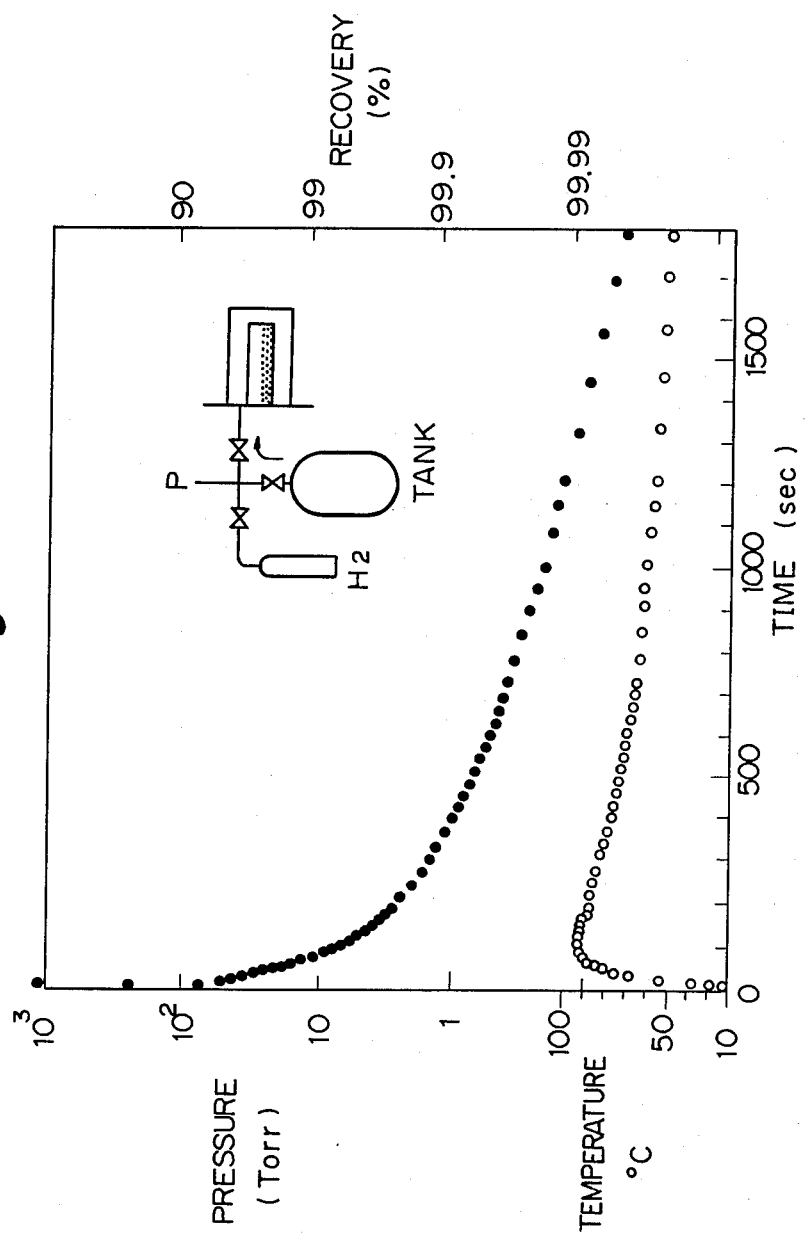

FIG. 4 is a graph showing an actual operation example of the active metal bed of the present invention, in which the ordinate is hydrogen pressure and recovery and the abscissa is time. The graph represents the change of pressure per unit time when absorbing hydrogen from a certain volume of tank, as a recovering characteristic of hydrogen by the bed.

Figure 5:
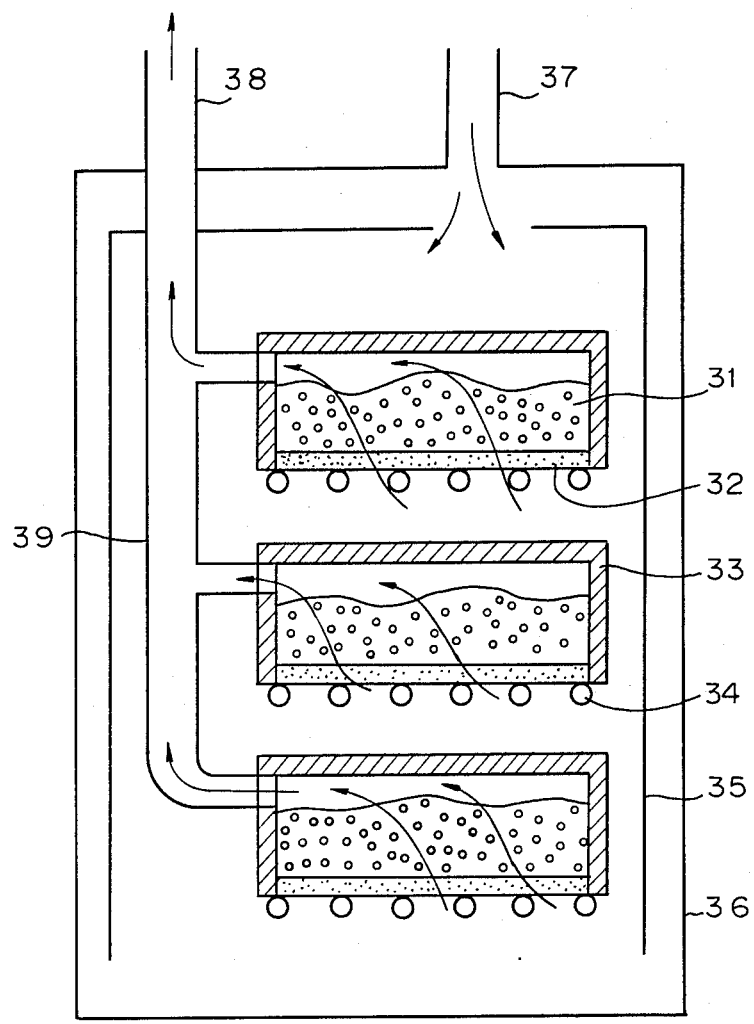

FIG. 5 is a figure showing a vertical-cylindrical type of active metal powder bed as another embodiment of the present invention, in which

| 31 | Active metal | 36 | Outer receptacle; |
|---|---|---|---|
| | Heater absorber; | 37 | Introducing tube; |
| 32 | Filter disc; | 38 | Discharging tube; |
| 33 | Metal case; | 39 | Gas discharging |
| 34 | Heater; | | header; |
| 35 | Heat shield plate. | | |

DESCRIPTION OF THE PREFERRED EMBODIMENTS

As the result of having researched diligently for attaining the object, the present inventors have conceived the optimum configuration of filter enclosing an active metal therein and the disposition of heater and equithermal block, and further thought that the thermal characteristic is improved by using a heat absorber such as copper particle mixed with an active metal powder.

That is, it is intended to attempt to increase the absorption velocity of tritium by arranging a filter unit so that an active metal has a gas contact area widely in the horizontal direction, and particularly in case of using plural units, arranging the gas flowing path in parallel, while improving the temperature control characteristic by restraining the rise of temperature in the hydrogenation of active metal powder and, at the time of heating, conducting heat from a heater wire to the active metal rapidly.

The apparatus of active metal bed of the present invention will be explained with reference to an embodiment shown in FIG. 2 as follows:

An active metal powder 11 is enclosed together with copper particles in a filter tube 12 placed horizontally so as to provide a space in the upper part. The powder 11 can contact with gas in a wide area in the horizontal direction through the filter 12 and can be heated by a heater 14 through an equithermal block 13 of perforated copper tube.

In the recovering operation, tritium, in case of being pure gas, is introduced from an introducing tube 17 to an outer receptacle 16 containing a heat shield plate 15 and is absorbed all together from the under surface of each filter tube 12. In case of recovering tritium from a gas mixture containing tritium, the gas is introduced from the introducing tube 17, passed through an active metal layer in each filter tube 12, collected in a gas discharging header 19 through the space in the upper part of each filter tube 12, and released through a discharge tube 18.

As shown by the cross-section view in FIG. 3, in the filter tube 12, a bypass flow which flows into the filter tube 12 from the upper and side surfaces of the filter tube 12 without passing through the active metal can be prevented by using an ordinary metal tube for the upper surface of each filter unit or by perforating only the under surface of the equithermal block 13.

According to such configuration, a large amount of active metal can be filled up in a small space, and, since the height of filling up is not so high, the possibility of the flow resistance of gas and the sintering by dead load is little. Moreover, a large recovering velocity of tritium can be obtained for all active metals contact with gas almost at the same time in a wide area.

A suitable heat absorber used in a mixture with active metal is a particle of about 1 mm in diameter of a material such as copper, which does not interreact with hydrogen, which is good in heat conductivity, and which has a large heat capacity. The particle controls the rise of temperature by absorbing rapidly the heat generated at the time of hydrogenation of active metal powder and conducting the heat to the filter to act to uniformalize the temperature of the whole of the active metal.

In the releasing operation of tritium, as shown in the cross-section view in the radial direction in FIG. 2, the active metal powder 11 is heated by applying an electric current to the heater 14 wound on the outside of the equithermal blocks 13 made up into a bundle. The heat is conducted rapidly to the active metal powder 11 within each filter tube 12 through the equithermal blocks 13 from the heater 14. The heat conduction in active metals is improved by the mixed heat absorber. As the result, the possibility of overheating is extremely reduced, since the whole of the active metal is rapidly heated to a predetermined temperature.

Moreover, since the portion to be heated does not directly contact with the outer receptacle 16, and since the radiant heat is broken by the heat shield plate 15, the temperature of the outer receptacle 16 does not rise so high, and the permeability and loss of tritium are restrained. The water cooling of the outer receptacle which is used in the bed in the prior art is not always required in the present invention.

EXAMPLE

FIG. 4 represents an absorption curve of hydrogen in a bed having the structure as shown in FIG. 2.

99% of 20 l of hydrogen was recovered in 60 seconds and 99.9% was recovered in 3 minutes. One filter tube was used, and 120 g of intermetallic compound ZrCo powder mixed with 350 g of copper paticle in 42-60 meshes were used as an active metal.

In the present invention, various shapes of bed can be obtained by making a unit having a filter surface wide in the horizontal direction, although, in FIG. 2 and in the Example, the filter tube is horizontally placed in the horizontal cylindrical container. FIG. 5 exemplifies a vertical cylindrical bed. In the filter unit of this figure, the upper surface is made of metal plate and the lower surface is a perforated disc. It is difficult in comparison with the case of horizontal type to provide a heater.

In addition to the ZrCo used in the Example, any hydrogen occluding alloy including alloys of uranium, rare earth metals and others in powder form can be used as the active metal. As a heat absorber used in the mixture thereof, which does not interreact with hydrogen and has good thermal characteristic, in addition to copper, aluminum and a nonmetal such as alumina are suitable. As to the shape, in addition particles, flakes, chips, fibers, and etc. are suitable. A sintered metal is optimum for the filter. The material is required to have heat resistance, chemical stability, and processability, in addition to sinterability, and at present stailess steel is the best. An equithermal block is desired to be used since stainless steel is not so good in heat conductivity, although it is not always necessary. In a horizontal cylindrical filter unit it is conceived to use a perforated conduit tube as a material.

What is claimed is:

1. An active metal bed comprising:
   (a) an outer receptacle;
   (b) a plurality of filter tubes horizontally disposed in said outer receptacle;
   (c) an active hydrogenization metal powder disposed in, but not filling, each one of said plurality of filter tubes, so that a gas flow volume is present in each one of said plurality of filter tubes above said active metal powder;
   (d) a plurality of equithermal blocks, each one of said plurality of equithermal blocks:
      (i) surrounding a corresponding one of said plurality of filter tubes;
      (ii) being pervious to gas flow beneath the level of the surface of said active metal powder and impervious to gas flow above the level of the surface of said active metal powder; and
      (iii) being in thermal contact with others of said plurality of equithermal blocks;
   (e) a heater in thermal contact with at least some of said plurality of equithermal blocks;
   (f) a gas discharge header in fluid communication with the interior of each one of said plurality of filter tubes;
   (g) an introducing tube leading from outside said outer receptacle to a volume in said outer receptacle outside said plurality of filter tubes; and
   (h) a discharging tube leading from said gas discharge header to the outside of said outer receptacle.

2. An active metal bed as recited in claim 1 and further comprising a heat shield disposed between the interior of said outer receptacle and said heater.

3. An active metal bed as recited in claim 1 wherein each one of said plurality of equithermal blocks is in surface abutting contact with the corresponding one of said plurality of filter tubes.

* * * * *